(No Model.)
E. G. SPENCER.
BRAKE BLOCK.
No. 257,249. Patented May 2, 1882.
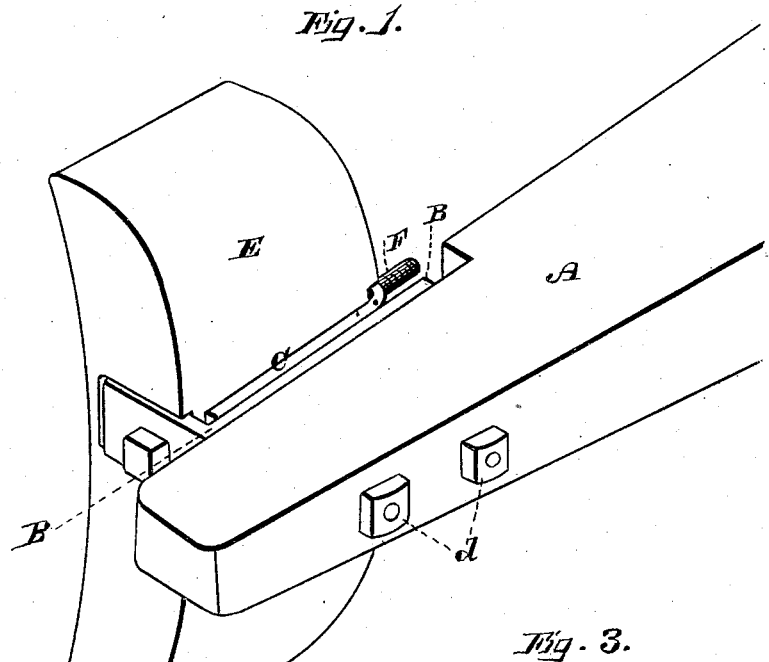
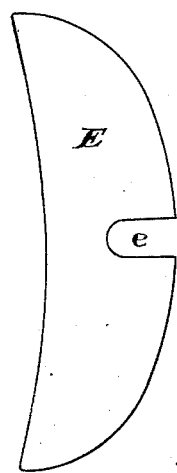
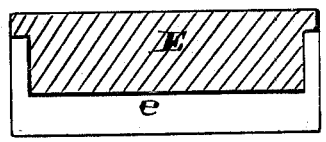
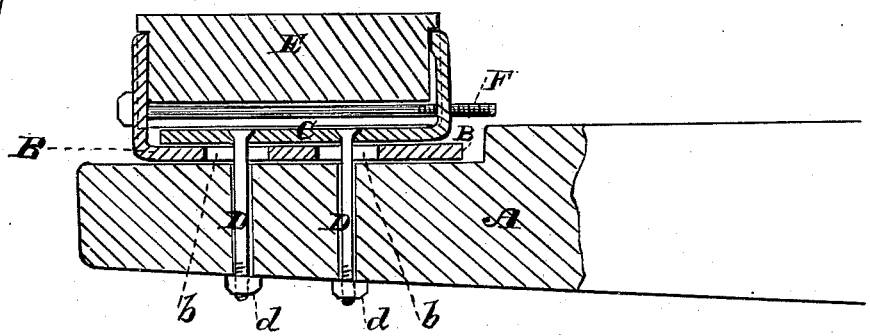
Witnesses,
Geo. H. Strong.
L. H. Krouse
Inventor
Edw<sup>d</sup> G. Spencer
By Dewey & Co.
Attorneys
N. PETERS, Photo-Lithographer, Washington, D. C.

UNITED STATES PATENT OFFICE.

EDWARD G. SPENCER, OF IOWA HILL, CALIFORNIA.

BRAKE-BLOCK.

SPECIFICATION forming part of Letters Patent No. 257,249, dated May 2, 1882.

Application filed February 21, 1882. (No model.)

*To all whom it may concern:*

Be it known that I, EDWARD G. SPENCER, of Iowa Hill, county of Placer, State of California, have invented an Improvement in Brake-Blocks; and I hereby declare the following to be a full, clear, and exact description thereof.

My invention relates to brake-blocks for vehicles; and it consists in an improvement in the details of construction of fastening the block to the brake-beam, whereby it is held securely, and may be readily removed when necessary.

Referring to the accompanying drawings, Figure 1 is a perspective view. Fig. 2 is a horizontal section. Fig. 3 is a horizontal section of the brake-block. Fig. 4 is a side view.

Let A represent an end of an ordinary brake-beam used upon vehicles. Its inner edge is preferably notched out, as shown, and against it lies a clamp or jaw, B, having its end turned at right angles. Upon the clamp B is another clamp, C, having its opposite end turned.

The inner clamp, B, is provided with elongated slots $b$, and the outer clamp has holes. Bolts D D pass from the inside through the holes and slots $b$ in both clamps and through the beam A, being secured by nuts $d$ upon their ends. The heads of the bolts are flattened and countersunk in order to preserve a flat surface upon the clamp C. This arrangement allows the clamp B to slide within limits while holding the clamp C rigidly.

Let E represent the brake-block. Its back is provided with a transverse groove, $e$, and its sides are notched out to allow the clamps to fit therein. The block is fitted between the clamps, its back lying closely against clamp C. A bolt, F, is passed loosely through the outwardly-turned end of clamp B, through the groove $e$ in the block, and through the turned end of clamp C, in which end screw-threads are provided for the screw end of the bolt.

The fastening of the brake-block is accomplished as follows: The bolts D D are first loosened and the adjustable or sliding clamp B drawn out to allow space enough between the ends of the clamps to insert the brake-block. This is fitted between the clamps, their ends lying in the notched sides of the block. The bolt F is then screwed up, forcing the sliding clamp inward until both clamps hold the block as tightly as desirable. The nuts $d$ are then screwed up and the bolts D tightened to hold the clamps in place. When the brake-block requires to be removed it is easily accomplished by loosening the bolts D and unscrewing bolt F, when it can be knocked out. The notched sides of the block, held tightly by the clamps, prevent it from working out.

I am aware that heretofore sliding adjustable clamps have been used to secure brake-shoes, wherein the clamping-screw formed an integral portion of one of the clamping-jaws, so that if the screws were broken or the thread of the screw is stripped the jaw of the clamp became useless, whereas in my construction the introduction of a new bolt repairs the shoe.

Having thus described my invention, what I claim as new, and desire to secure by Letters Patent, is—

The combination and arrangement of the brake-beam A, sliding or adjustable clamp or jaw B, with its slots $b$, stationary clamp or jaw C, securing-bolts D D, with their nuts, brake-block E, with its transverse groove $e$ and notched sides, and the separate clamping and adjusting bolt F, substantially as and for the purpose herein described.

In witness whereof I hereunto set my hand.

EDWARD GEORGE SPENCER.

Witnesses:
  W. W. ANDERSON,
  H. GREENBOWER.